Patented Aug. 9, 1932

1,871,038

UNITED STATES PATENT OFFICE

SIDNEY M. CADWELL, OF GROSSE POINTE PARK, MICHIGAN, ASSIGNOR TO THE NAUGATUCK CHEMICAL COMPANY, OF NAUGATUCK, CONNECTICUT, A CORPORATION OF CONNECTICUT

VULCANIZATION OF RUBBER AND SIMILAR MATERIALS

No Drawing.   Application filed November 27, 1931. Serial No. 577,703.

This invention relates to improvements in the treatment of rubber, and particularly in connection with the dry heat cure of rubber and similar vulcanizable material containing an organic accelerator of vulcanization.

An object of this invention is to provide an economical and improved method of dry heat curing rubber goods containing organic accelerators of vulcanization whereby the quality and appearance of said goods are enhanced. A further object is to provide in a method of dry heat curing rubber containing vulcanizing ingredients including certain accelerators of vulcanization, chemical means for supplementing the vulcanization of said ingredients which means is also adapted to be diffused into the rubber during the vulcanizing treatment.

Heretofore the curing of rubber goods in dry heat has required the use of organic accelerators in amounts from two to five times greater than those required for mold curing. A method of curing rubber stocks containing organic accelerators in dry heat has now been discovered wherein the amounts of organic accelerators employed may be markedly reduced below those normally required for dry heat cures, and being usually no greater than those which would normally be used in a mold cure. The method whereby the amounts of organic accelerators may be reduced as stated comprises vulcanizing rubber containing sulphur and such reduced amount of organic accelerator in an atmosphere containing ammonia, particularly in a closed type of vulcanizer at elevated temperatures and pressures.

Ammonia has been heretofore indicated as applicable in certain instances as a vulcanizing aid in the absence of organic accelerators. More recently ammonia has been indicated as a means of converting certain organic accelerators incorporated with the rubber into faster accelerators whereby the direct incorporation of the more powerful accelerators and the consequent risk of prevulcanization and burning on the mill may be avoided. In the latter instance, the amounts of the particular organic accelerators to be used have been the full amounts normally required for a dry heat cure, and the purpose of using the ammonia was to produce in the rubber after milling substantially the same or greater amounts of a particular faster accelerator by a process of chemical conversion.

Accordingly the invention broadly comprises the vulcanization in an atmosphere containing gaseous ammonia of a rubber stock containing a vulcanizing agent and an organic accelerator said accelerator being employed in an amount substantially below that normally required for dry heat curing. Any recognized organic accelerator may be used, the following being given as typical:

(a) *Aldehyde-amines.*—Triethyltrimethylene triamine, heptaldehyde-aniline, ethylidine - aniline, butyraldehyde - butylamine, butyraldehyde-aniline, and aldehyde derivatives of aldehydeamines such as the formaldehyde derivative of ethylidene-aniline and the acetaldehyde derivative of ethylidene-aniline.

(b) *Benzothiazyl sulphides.*—Mercaptobenzothiazole, benzothiazyl disulphide, polynitroaryl benzothiazyl sulphides, such as 2-4 dinitrophenyl benzothiazyl sulphide, 2-6 dinitro-4-chlorophenyl benzothiazyl sulphide, 2-4-6 trinitrophenyl benzothiazyl sulphide.

(c) *Esters and salts of dithiocarbamic acid.*—Polynitroaryl and arylmethylene esters of dithiocarbamic acid, for example, 2-4 dinitrophenyl dimethyl dithiocarbamate, and benzal bis (dimethyl dithiocarbamate), and metal salts of such acids, for example zinc salts thereof.

(d) *Organic sulphides.*—Thiuram sulphides such as tetramethyl thiuram disulphide, tetramethyl thiuram monosulphide; carbalkoxythione sulphides such as oxynormal butyl thiocarbonic acid disulphide, and di-isopropyl xanthogen.

(e) *Carbon bisulphide derivatives of aldehyde-amines.*—Carbon disulphide derivative of butyraldehyde-aniline.

(f) *Aryl substituted guanidines*, for example, diphenylguanidine, phenyl o-tolyl guanidine, di-o-tolyl guanidine.

(g) *Polyalkylene polyamines*, their aldehyde reaction products and aldehyde derivatives of such aldehyde reaction products that have accelerating properties, for example: polyethylene polyamine, polypropylene polyamine, polyamylene polyamine, polystyrylene polyamine; aldehyde derivatives of polyalkylene polyamines such as formaldehyde-polyethylene polyamine condensation product, acetaldehyde polyethylene polyamine condensation product, butyraldehyde-polyethylene polyamine condensation product, propionaldehyde polyethylene polyamine condensation product, heptaldehyde-polyethylene polyamine condensation product, and the aldehyde derivatives of such condensation products. By polyalkylene polyamines are meant the higher boiling aliphatic bases prepared by reacting an alkylene dihalide with ammonia.

The following examples illustrate the effects of vulcanizing a stock containing no organic accelerator in the presence of ammonia, and the combined effect of an organic accelerator and ammonia on vulcanization, in one instance where normal amounts of accelerator are used and another instance where reduced amounts are used. The vulcanization is carried out on stocks of small thickness under commercial conditions using temperatures of vulcanization above 212° F. The parts are by weight.

Example 1 (typical shoe upper stock)

|  | A | B | C |
| --- | --- | --- | --- |
| Pale crepe | 39 | 39 | 39 |
| Zinc oxide | 4 | 4 | 4 |
| Sulphur | 1 | 1 | 1 |
| Lampblack | 2.9 | 2.9 | 2.9 |
| Gilder's whiting | 41.4 | 41.4 | 41.4 |
| Paraffin oil | 3 | 3 | 3 |
| Triethyltrimethylene triamine | | .15 | 1.5 |
| Green tensile tests | | | |
| Cure No. 1 | 705 | 1870 | 1855 |
| Cure No. 2 | Uncured. | 673 | 1671 |
| Differences between No. 1 and No. 2 | 300 (Estimated.) | 1197 | 184 |

Cure No. 1 was carried out by placing the sheeted stocks into a closed type of vulcanizer connected to a tank of ammonia, closing the vulcanizer, and introducing ammonia gas until a pressure of 4 pounds per square inch was developed, after which the ammonia flow was cut off. The temperature within the vulcanizer was raised gradually to 250° F. during 30 minutes and was so held at 250° F. for 60 minutes.

Cure No. 2 was carried out under the same conditions of time and temperature as cure No. 1 but instead of using ammonia under pressure only air was introduced until a pressure of 4 lbs. per sq. in. was developed. Cure No. 2 represents an ordinary dry heat cure.

It is to be noted that the 1.5 parts of the accelerator used in compound C above is representative of the normal amount of said accelerator required in ordinary dry heat cures. From the above data it will be seen that stock B which contained one tenth (1/10) of the normal amount of accelerator and was cured in dry heat in the presence of ammonia according to this invention, was superior to stock C which contained a normal amount of accelerator and was subjected to an ordinary dry heat cure. It is also clear that the combined effect of the ammonia and of the reduced amount of organic accelerator operating jointly according to the present invention is far greater than the sum of the respective effects when the ammonia and the organic accelerator are employed separately. Thus the amounts of organic accelerators which may be used in the process according to the present invention to produce well-cured rubber stocks are entirely insufficient to effect proper vulcanization in the usual process of dry heat curing. This is exemplified by the above and the succeeding examples.

Example 2

A stock made up of:

| | |
| --- | --- |
| Smoked sheet | 100 |
| Zinc oxide | 20 |
| Lamp black | 7 |
| Gilder's whiting | 100 |
| Spindle oil | 10 |
| Sulphur | 2½ |
| Non-accelerating acetaldehyde condensation product (antioxidant) | 3 | and 1.25 parts of heptaldehyde-aniline condensation product diluted with spindle oil and sold under the trade name of "Hepteen", are mixed on the rolls in the usual manner. This stock is calendered to a thickness of .040″ and laid on a steel surface, and placed in a pressure vulcanizer, which is then closed. Gaseous ammonia is introduced until a pressure of 6 pounds per square inch is developed. Air is then introduced until a total pressure of 30 pounds per square inch is developed. Heat is then applied so that the temperature within the vulcanizer rises to 240° F. in the course of 35 minutes. The temperature is then maintained at 240° F. for 45 minutes.

The tensile obtained was 2106. The same procedure was repeated omitting the ammonia and the tensile obtained was 158 pounds per square inch. A similar stock containing 2.5 parts of the same accelerator was cured in air and the tensile displayed after cure was 443 pounds per square inch.

The stock cured in ammonia displays a hard, dry surface even when hot. It ages exceptionally well and shows a high resistance to breakdown during flexing.

Example 3

A stock containing 100 parts of rubber, 10 parts zinc oxide, 3 parts sulphur, and .35 parts of polymerized triethyltrimethylene triamine is mixed on the rolls in the usual manner. A similar mix is made containing .7 part of the same accelerator. These stocks are calendered separately and placed in a jacketed heater; the heater is closed and ammonia is admitted to a pressure of approximately 4 lbs. Air under pressure may or may not be admitted. In the present example no air other than that originally present was admitted. Steam is admitted to the jacket of the heater at such a rate that the temperature of the interior of the heater rises to 240° F. in 30 minutes, and then from 240° to 270° in 60 minutes. The cures are then completed by heating for 20 minutes at 270° F.

Similar stocks were made as above described, and cured as above described with the exception that 4 lbs. of air pressure was used and no ammonia gas was admitted to the heater. The data obtained from these experiments are as follows:

Pale crepe _____ 100   100
Zinc Oxide _____  10    10
Sulphur _____   3     3
Triethyltrimethylene
   triamine _____  .35   .70
(30' rise to 240° F.
(60' rise 240° F. to 270° F.
(20' at 270° F.

Tensiles (lbs. per sq. in.)
Air _____ 950   1085
Ammonia and air _____ 2560  2510

*Example 4*

To show the results when various other types of accelerators are used in accordance with the invention a rubber master batch was compounded in the usual manner comprising 100 parts of pale crepe rubber, 22 parts of lithopone, 8 parts of whiting, and 10 parts of zinc oxide. From this master batch were prepared a series of stocks by the addition thereto of amounts of sulphur and accelerators as follows:

| | Stock | Accelerator | Sulfur | Stock | Accelerator | Sulfur |
|---|---|---|---|---|---|---|
| Tetramethyl thiuram-disulfide | A | .5 | 2 | E | .25 | 1.5 |
| Tetramethyl thiuram-monosulphide | B | .5 | 2 | F | .25 | 1.5 |
| 2,4-dinitrophenyl dimethyl dithiocarbamate | C | 1.5 | 2 | G | .36 | 1.5 |
| Mercaptobenzothiazole | D | 1.5 | 2 | H | .50 | 1.5 |

The eight above-characterized stocks were cured under optimum conditions for each stock, as follows: Stocks A, B, C, and D containing normal amounts of accelerator required in the ordinary dry heat cure, were cured in a vulcanizer containing air at a pressure of 30 lbs. per sq. inch according to the following schedule, which is representative of the usual practice:

35 mins. rise from room temperature to 240° F., followed by 55 mins. gradual rise from 240° to 250° F., the temperature then being held for 15 mins. at 250° F. in the case of stocks A, B, and C, and for 30 mins. at 250° F. in the case of stock D.

Stocks E, F, G, and H containing insufficient accelerator to effect a satisfactory cure according to the usual methods of dry heat curing, were cured in a vulcanizer containing ammonia at a partial pressure of 6 lbs. and sufficient air so that the total pressure was 25 lbs., the cure being carried out according to the following schedule:

60 mins. rise from room temperature to 240° F., followed by a gradual rise from 240° to 250° F., the temperature then being held for 30 mins. at 250° F.

Tensile tests following the cures gave the results indicated below (in lbs. per sq. in.):

| Usual dry heat cure (normal amounts of accelerators) | | Dry heat cure in presence of ammonia (reduced amounts of accelerators) | |
|---|---|---|---|
| Stock | Tensile at break | Stock | Tensile at break |
| A | 2200 | E | 3630 |
| B | 2020 | F | 3500 |
| C | 1990 | G | 3130 |
| D | 2020 | H | 3420 |

The following table is further illustrative of the amounts of various accelerators which may be employed in carrying out the process of the present invention, and the amounts of the same accelerators which are required for the production of optimum cures according to the usual methods of dry heat curing (referred to 100 parts by weight of rubber):

| Accelerator | Amount required | |
|---|---|---|
| | Dry heat cure with ammonia | Ordinary dry heat cure |
| Tetramethyl thiuram disulphide | 0.1-0.15 | 0.35-0.5 |
| Tetramethyl thiuram monosulphide | 0.1-0.15 | 0.35-0.5 |
| Mercaptobenzothiazole | 0.3-0.5 | 1.5 -2.0 |
| 2,4-dinitrophenyldimethyldithiocarbamate | 0.3-0.4 | 0.9 -1.5 |
| 2,4-dinitrophenyl benzothiazyl sulphide | 0.4-0.5 | 3.0 -4.0 |
| Zinc dimethyl dithiocarbamate | 0.1-0.15 | 0.25-0.5 |
| Polymerized triethyltrimethylene triamine | 0.1-0.5 | 1.0 -2.0 |
| Heptaldehyde-aniline (undiluted) | about 0.3 | about 0.5 |

In general, the amounts of various organic accelerators required for successful practice of the present invention may range from about 10% to about 60% of the amounts of the same accelerators required in the usual methods of dry heat curing.

This invention may be used to replace hot air cures of all types of vulcanized goods which are now given this cure. In carrying out the process of the invention ammonia pressures ranging from about 1 to about 10 lbs. per sq. in., with or without the use of additional air pressure, are preferable, although higher ammonia pressures may be used, if desired. Instead of air, inert gases, such as carbon dioxide or steam, may be used mixed with the ammonia. Articles which may be cured by the use of this invention as herein described include all kinds of rubber footwear, raincoats, dipped goods, tubing, bathing caps, rubber blankets, water bottles, water toys, etc.

Rubber when vulcanized according to the process of the present invention allows of economies of operation and improvement in the physical properties of the rubber goods definitely and favorably beyond that attendant the older method of producing vulcanized rubber goods by the dry heat air cure. There is a marked saving in the amount of organic accelerator beyond any normal expectation even though ammonia was found to operate to supplement its vulcanizing action to provide a satisfactory cure. Stocks prepared with the smaller amount of accelerator have a much less tendency to burn on the mixing mill or to "set up" on standing, and when vulcanized under the conditions described show higher tensiles and as much as 100% better resistance to breakdown during mechanical flexing and definitely improved resistance to deterioration on standing, i. e. better ageing. Surface oxidation during cure is substantially eliminated and the rubber shows a non-tacky fine hard shining surface even when hot, and does not mar when handled in a warm condition, particularly when the gaseous pressure during the cure is greater than atmospheric. The efficiency of the accelerator, the time of cure, and the appearance of the finished article, are all more satisfactory when the conditions of this invention are followed than when those of ordinary dry heat air curing are carried out. This invention is particularly important in the field of footwear to produce articles that definitely outwear footwear vulcanized under the conditions of the old method of dry heat curing. Footwear upper stock produced according to the present invention has a finer appearance, withstands flexing better, is stronger, shows less surface deterioration and outwears footwear produced heretofore by dry heat cures.

The expression "aldehyde-amine condensation product" in the claims is to be construed broadly as covering the condensation product of an aldehyde and an amine, or aldehyde derivatives of such condensation products.

This case is a continuation in part of my case Serial No. 418,399, filed Jan. 3, 1930.

With the detailed disclosure above given, it is obvious that modifications will suggest themselves, and it is not desired to limit the invention otherwise than as set forth in the appended claims.

Having thus described my invention, what I claim and desire to protect by Letters Patent is:

1. A process of producing vulcanized rubber by dry heat which comprises incorporating into rubber a vulcanizing agent and an organic accelerator and vulcanizing the rubber in an atmosphere containing gaseous ammonia, said organic accelerator being employed in an amount insufficient to effect proper vulcanization in the absence of the ammonia.

2. A process of producing vulcanized rubber by dry heat which comprises incorporating into rubber a vulcanizing agent and an organic accelerator and vulcanizing the rubber in an atmosphere comprising air and ammonia, said organic accelerator being employed in an amount substantially less than that which would be required for an ordinary dry heat air cure.

3. A process of producing vulcanized rubber by dry heat which comprises incorporating into rubber a vulcanizing agent and an organic accelerator and vulcanizing the rubber in an atmosphere comprising air and ammonia, the partial pressure of the ammonia being at least about 1 pound per sq. inch, said organic accelerator being employed in an amount substantially less than that which would be required for an ordinary dry heat air cure.

4. A process of producing vulcanized rubber by dry heat which comprises incorporating into rubber a vulcanizing agent and an organic accelerator and vulcanizing the rubber in an atmosphere comprising air and ammonia, the partial pressure of the ammonia being at least about 1 pound per sq. inch, said organic accelerator being employed in an amount between about 10 and about 60 percent by weight of the amount which would be required for an ordinary dry heat air cure.

5. A process of producing vulcanized rubber by dry heat which comprises incorporating into rubber a vulcanizing agent and an organic accelerator and vulcanizing the rubber in an atmosphere comprising air and ammonia, the partial pressure of the ammonia being at least about 1 pound per sq. inch, said organic accelerator being employed in an amount substantially equal to that which would be required for mold curing the same stock.

6. A process of producing vulcanized rubber by dry heat which comprises incorporating into rubber a vulcanizing agent and an organic accelerator, said organic accelerator being employed in an amount substantially less than that which would be required for an ordinary dry heat cure, placing the stock in a vulcanizer, subjecting the stock to the action of a mixture of air and ammonia under superimposed pressure and raising the temperature in the vulcanizer, and completing the vulcanization of the stock at elevated temperatures in the presence of said mixture of air and ammonia.

7. A process of producing vulcanized rubber by dry heat which comprises incorporating into rubber a vulcanizing agent and an accelerating aldehyde-amine condensation product and vulcanizing the rubber in an atmosphere containing gaseous ammonia, said condensation product being employed in an amount insufficient to effect proper vulcanization in the absence of the ammonia.

8. A process of producing vulcanized rubber by dry heat which comprises incorporating into rubber a vulcanizing agent and an accelerating aldehyde-amine condensation product and vulcanizing the rubber in an atmosphere comprising air and ammonia the partial pressure of the ammonia being at least about 1 pound per sq. inch, said condensation product being employed in an amount between about 10 and about 60 percent by weight of the amount which would be required for an ordinary dry heat air cure.

9. A process of producing vulcanized rubber by dry heat which comprises incorporating into rubber a vulcanizing agent and an accelerating heptaldehyde-aniline condensation product and vulcanizing the rubber in an atmosphere containing gaseous ammonia, said condensation product being employed in an amount insufficient to effect proper vulcanization in the absence of the ammonia.

10. A process of producing vulcanized rubber by dry heat which comprises incorporating into rubber a vulcanizing agent and an accelerating heptaldehyde-aniline condensation product and vulcanizing the rubber in an atmosphere comprising air and ammonia, said condensation product being employed in an amount substantially less than that which would be required for an ordinary dry heat air cure.

11. A process of producing vulcanized rubber by dry heat which comprises incorporating into rubber a vulcanizing agent and an accelerating mercaptothiazole and vulcanizing the rubber in an atmosphere containing gaseous ammonia, said mercaptothiazole being employed in an amount insufficient to effect proper vulcanization in the absence of the ammonia.

12. A process of producing vulcanized rubber by dry heat which comprises incorporating into rubber a vulcanizing agent and an accelerating mercaptothiazole and vulcanizing the rubber in an atmosphere comprising air and ammonia, the partial pressure of the ammonia being at least about 1 pound per sq. inch, said mercaptothiazole being employed in an amount between about 10 and about 60 percent by weight of the amount which would be required for an ordinary dry heat air cure.

13. A process of producing vulcanized rubber by dry heat which comprises incorporating into rubber a vulcanizing agent and mercaptobenzothiazole and vulcanizing the rubber in an atmosphere containing gaseous ammonia, said mercaptobenzothiazole being employed in an amount insufficient to effect proper vulcanization in the absence of ammonia.

14. A process of producing vulcanized rubber by dry heat which comprises incorporating into rubber a vulcanizing agent and mercaptobenzothiazole and vulcanizing the rubber in an atmosphere comprising air and ammonia, said mercaptothiazole being employed in an amount substantially less than that which would be required for an ordinary dry heat air cure.

15. A process of producing vulcanized rubber by dry heat which comprises incorporating into rubber a vulcanizing agent and an accelerating thiuramsulphide and vulcanizing the rubber in an atmosphere containing gaseous ammonia, said sulphide being employed in an amount insufficient to effect proper vulcanization in the absence of the ammonia 16. A process of producing vulcanized rubber by dry heat which comprises incorporating into rubber a vulcanizing agent and an accelerating thiuramsulphide and vulcanizing the rubber in an atmosphere comprising air and ammonia, the partial pressure of the ammonia being at least about 1 pound per sq. inch, said sulphide being employed in an amount between about 10 and about 60 percent by weight of the amount which would be required for an ordinary dry heat air cure.

17. A process of producing vulcanized rubber by dry heat which comprises incorporating into rubber a vulcanizing agent and tetramethyl thiuram disulphide and vulcanizing the rubber in an atmosphere containing gaseous ammonia, said disulphide being employed in an amount insufficient to effect proper vulcanization in the absence of the ammonia.

18. A process of producing vulcanized rubber by dry heat which comprises incorporating into rubber a vulcanizing agent and tetramethyl thiuramdisulphide and vulcanizing the rubber in an atmosphere comprising air and ammonia, said disulphide being employed in an amount substantially less than that which would be required for an ordinary dry heat air cure.

Signed at Detroit, County of Wayne, State of Michigan, this 23rd day of November, 1931.

SIDNEY M. CADWELL.